Dec. 23, 1924.
F. J. HARDMAN
1,520,682
BATTERY CHARGING SYSTEM
Filed Feb. 16, 1920
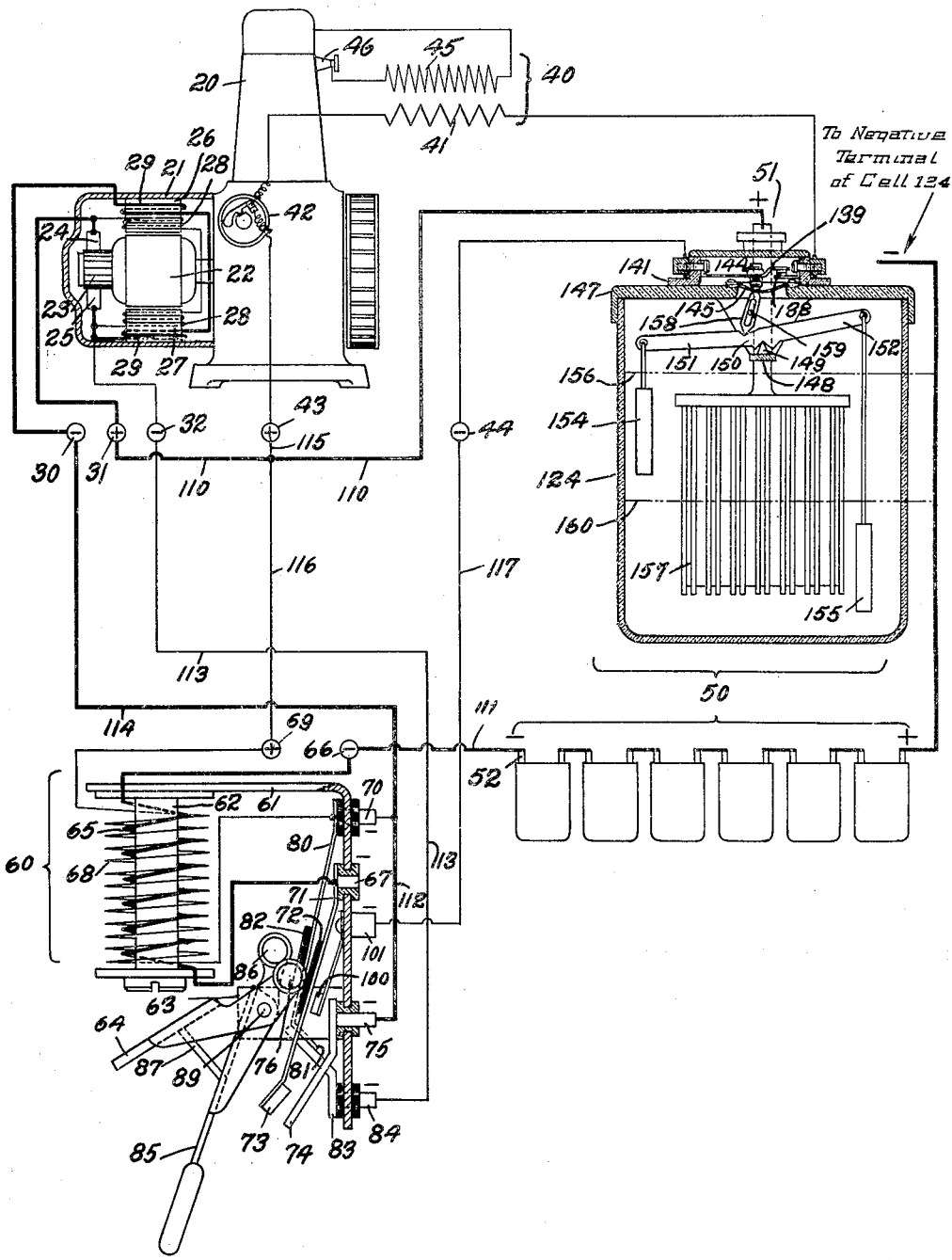

Patented Dec. 23, 1924.

1,520,682

UNITED STATES PATENT OFFICE.

FREDERICK J. HARDMAN, OF DAYTON, OHIO, ASSIGNOR TO DELCO-LIGHT COMPANY, OF DAYTON, OHIO, A CORPORATION OF DELAWARE.

BATTERY-CHARGING SYSTEM.

Application filed February 16, 1920. Serial No. 358,974.

*To all whom it may concern:*

Be it known that I, FREDERICK J. HARDMAN, a citizen of the United States of America, residing at Dayton, county of Montgomery, and State of Ohio, have invented certain new and useful Improvements in Battery-Charging Systems, of which the following is a full, clear, and exact description.

This invention relates to battery charging systems including a storage battery and a generator driven by an internal-combustion engine and an ignition system for the engine. The system to which the present invention relates also includes means for automatically disconnecting the generator and ignition system from the battery when the speed of the engine falls below a predetermined amount, so that the storage battery will not be discharged through the generator and so that the engine will stop.

One of the objects of the present invention to is to cause the engine to stop when the battery is substantially fully charged, thus permitting the operation of the automatic means for disconnecting the battery; and to provide that the engine stopping means of the invention shall be operative for a brief period and one long enough for the engine to come to rest, and further, to provide that this automatic means shall not render the engine permanently inoperative or make it necessary to wait for a substantial period of time to elaspe before the engine can be started by the usual means.

One manner of carrying out the foregoing objects and aims of the invention is to provide the primary ignition circuit of the engine with two switches, one of which is initially closed manually and is held closed automatically as long as the engine speed exceeds a predetermined amount; and the other of which is normally closed but is controlled by a hydrometer element located in one of the battery cells in such a manner as to be temporarily opened long enough to cause the engine to stop and permit the battery to be disconnected from the ignition circuit and from the generator. It is desirable that this latter switch should be reclosed after a brief period, so thereafter the manually controlled switch may be again closed, if desired, to complete the ignition circuit. In this manner it will not be necessary to wait for a period of time until the storage battery may be discharged sufficiently before the hydrometer switch may be again closed.

Other and further objects of the present invention will be apparent from the following description, reference being had to the accompanying drawing wherein a preferred embodiment of the present invention is clearly shown.

The drawing shows a wiring diagram of the electrical system embodying the present invention together with a diagrammatic side elevation of an internal-combustion engine directly coupled with a generator, a part of which is shown in section, a diagrammatic side elevation partly in section of a controller, and a sectional view of a storage battery provided with a hydrometer switch.

In the drawings, 20 designates an internal-combustion engine driving a dynamo electric machine 21 which is directly connected with the engine. Dynamo electric machine 21 includes an armature 22, commutator 23, brushes 24 and 25, and field pole pieces 26 and 27. It is provided with a shunt field 28 connected across the brushes 24 and 25, and with a series field 29, one end of which is connected with brush 25, and the other with dynamo terminal 30. Brush 24 is connected with terminal 31, and brush 25 with terminal 32.

Ignition for the engine is furnished by the agency of the ignition coil 40 which includes primary 41 connected with timer 42, which in turn is connected with ignition terminal 43. The other end of primary 41 is connected with switch contact 138 cooperating with contact 139 which in turn is connected with ignition terminal 44. Secondary winding 45 is connected at one end with spark plug 46 and grounded at the other end upon the engine.

50 designates a storage battery, the positive side of which is connected with terminal 51 and the negative side with terminal 52. Said battery includes a special cell 124 to be described.

The controller 60 will now be described. This controller includes a frame 61 of magnetic material supporting a magnet core 62 and an armature post 63. Post 63 supports a pivotally mounted armature 64. A magnetic circuit is formed by members 62, 61, 63, and 64, with a gap between the armature 64 and the core 62. Upon the core 62 is mounted a series magnet winding 65, one end being connected with terminal 67 and the other end being connected with terminal 66. The core 62 also supports a shunt magnet winding 68, one end being connected with a terminal 69 and the other end connected with terminal 70.

Terminal 67 is connected with a resilient conductor 71 carrying a non-conducting rubbing-block 72 and a contact 73. Contact 73 is arranged to engage with contact 74 which is connected with terminal 75. A roller 76, pivotally mounted upon the armature 64, engages the rubbing-block 72 when the armature 64 is moved upwardly, in order to move contact 73 into engagement with contact 74.

Contact 70 is connected with resilient conducting member 80 having its outer end bent over to form a contact 81 and carrying intermediate its ends a non-conducting rubbing-block 82. Contact 81 is arranged to engage with contact 83 which is connected with terminal 84. A controlling lever 85, pivotally mounted upon the armature post 63, carries a roller 86 which is arranged to engage with the rubbing-block 82 for the purpose of moving the contact 81 out of engagement with the contact 83.

Lever 85 is provided with a projecting tongue 87 which is arranged to move the armature 64. The lever 85 and the armature 64 are preferably mounted upon pin 89, supported by armature post 63.

A resilient conductor 100 mounted directly upon the frame 61 is located within the path of motion of the conductor 71 so as to be engaged thereby when the contacts 73 and 74 are closed.

The connections between the generator, battery, ignition apparatus, and the controller are as follows: Generator terminal 31 is connected with battery terminal 51 by a wire 110. Terminals 70 and 75 are connected by bus-bar 112. Controller terminal 84 is connected with generator terminal 32 by a wire 113. Controller terminal 70 is connected with generator terminal 30 by a wire 114. Controller terminal 66 is connected with battery terminal 52 by wire 111. Wire 110 is connected by wire 115 with ignition terminal 43, and by wire 116 with controller terminal 69. Ignition terminal 44 is connected by wire 117 with terminal 101.

The operation of the controller is as follows: To start the engine, the lever 85 is pulled upward to effect engagement of contact 73 with contact 74, of member 71 with member 100, and the disengagement of contact 81 from contact 83.

The following cranking circuit will then be established: from the positive terminal 51 of the battery 50, through wire 110, generator terminal 31, brush 24, armature 22, brush 25, series winding 29, terminal 30, wire 114, terminal 70, bus-bar 112, terminal 75, contact 74, contact 73, conductor 71, terminal 67, series winding 65, terminal 66, and wire 111 to battery terminal 52. It will be noted that when contacts 81 and 83 are closed a low resistance circuit is established from generator terminal 32 through the conductor 113, terminal 84, contacts 83 and 81, and thence from terminal 70 to the battery terminal 52 by the path already described, thereby short circuiting the series winding 29, but since contacts 81 and 83 are separated at starting, as above pointed out, the short circuit around the series winding is interrupted and the dynamo-electric machine operates as a compound wound motor, the shunt winding 28 being at all times connected across the brushes 24 and 25.

When the starting lever 85 is still in the position described, the following ignition circuit will be established: from the battery terminal 51, through wire 110, wire 115, ignition terminal 43, timer 42, primary 41, switch contacts 138 and 139, ignition terminal 44, wire 117, controller terminal 101, contact 100, conductor 71, terminal 67, winding 65, terminal 66, wire 111, to battery terminal 52.

After the engine has become self-operative it will quickly pick up in speed and will operate the dynamo electric machine as a generator to furnish current for battery charging purposes. In order to maintain the circuit connections between the generator and battery that current may be delivered to the battery from the generator, series magnet winding 65 and shunt magnet winding 68 are utilized. The former winding being a current winding and the latter a voltage winding, the armature 64 is maintained in attracted position with respect to magnet core 62 as long as the output of the generator exceeds a predetermined value.

With the armature 64 maintained magnetically in circuit closing position, the starting lever 85 may be released, causing the contacts 81 and 83 to be brought together to short-circuit the series-field winding 29. The dynamo electric machine will then act as a shunt-wound generator to charge the battery.

In case the speed of the engine falls off to such a low value that the voltage of the generator falls below a value sufficient to oppose the battery voltage, the current from the battery will tend to flow toward the generator to drive the same as a motor. When this occurs there will be a reversal of current in the series magnet winding 65 which will tend to create magnetism in opposition to that created by the voltage winding 68. When this occurs the attractive force upon the armature 64 will not be sufficient to maintain it in circuit closing position against the forces exerted by the resilient conducting member 71 upon the roller 76.

The controller 60 which has been described is a separate invention and is described and claimed in the co-pending application of Lester S. Keilholtz, Serial No. 310,109, filed July 11, 1919.

The mechanism for operating the switch contacts 138 and 139 will now be described. These contacts 138 and 139 are mounted within an acid proof enclosure formed by a box like housing 141 supported upon the cover 147 of the battery cell 124. Parts 141 and 147 are preferably constructed of rubber and the cover 147 is provided with an orifice closed by a rubber diaphragm 145 through which motion may be transmitted from member 158 to an adjusting screw 144 carried by the contact 139. The cover 147 supports a shelf 148 carrying a knife edged fulcrum 149 upon which is mounted a beam 150 having an arm 151 which is slightly longer than the arm 152. The shape of the beam 150 is such that the center of gravity lies above the fulcrum 149. Displacement members 154 and 155 are suspended from beam arms 151 and 152, respectively, and on opposite sides of the storage battery plates 157. Member 154 is suspended within the upper level 156 of the electrolyte of the cell, while displacement member 155 is supported within the bottom level of the cell electrolyte. The member 158 slides upon a pin 159 carried by the cover 147 and co-operates as a toggle member with the beam 150 to transmit motion in a manner to be described through diaphragm 145 to the screw 144.

The hydrometer switch which has just been described is a separate invention and is described and claimed in the copending patent of Thomas Midgley, jr., No. 1,337,366, dated April 20, 1920.

The following is a brief description of the operation of the hydrometer switch: It has been discovered that while the battery is being charged the density of the electrolyte is not uniform but ranges from a lower value at the top of the electrolyte to a higher value at the bottom. While there is no abrupt change in the degree of density of the electrolyte at different levels, for the sake of convenience, the imaginary line 160 designates a division between the upper layers of electrolyte of lower density and the layers of the electrolyte at higher density located below the line 160. While the battery is being charged the beam 150 remains in the position shown in the drawing for the reason that, since the displacement members 154 and 155 are made the same in weight and volume, the lifting force exerted by the electrolyte of higher density upon displacement member 155 will be greater than the lifting force by the electrolyte of lower density upon the displacement member 154. It is also seen that the arm 151 of beam 150 is slightly longer than beam 152. This will aid to some extent in maintaining the beam in the position shown. Just before the battery is fully charged there is an inversion of the stratification during which the electrolyte of higher density will rise to the upper level and cause the electrolyte of lower density to be displaced and to move to the bottom of the cell. This phenomenon causes the lifting force upon the displacement member 154 to become enough greater than that upon the displacement member 155 to cause the clockwise rotation of beam 150 and to effect the separation of the contacts 138 and 139. When the contacts 138 and 139 are open the ignition system of the engine will be rendered inoperative causing the engine to slow down. The inversion of stratification will persist long enough for the speed to fall below a predetermined value. When this occurs the potential of the generator will fall below the potential of the battery permitting current to flow back through the battery to the generator. When this occurs the controller 60 will operate to disconnect the battery from the generator, and to provide a second break in the primary ignition circuit of the engine. As has been described this second break will occur between the contact members 71 and 100.

After a brief period the inversion of stratification will cease and the beam 150 will be restored automatically to normal position as is shown in the drawing, thus permitting the contacts 138 and 139 to be closed. The closing of these contacts has no effect upon the electrical system since the primary ignition circuit has already been broken at the contacts 71 and 100. Therefore, the restoration of the hydrometer switch after the period of inversion of stratification will not cause the discharge of the battery through the ignition system.

The engine starting system is now in condition for manual control, since the only remaining gap in the primary ignition circuit may be closed by pulling up the starting lever 85.

While the form of mechanism herein shown and described constitutes a preferred embodiment of one form of the invention, it is to be understood that other forms might be adopted and various changes and alterations made in the shape, size, and proportions of the elements therein, without departing from the spirit and scope of the invention.

What I claim is as follows:

1. In a battery charging system, the combination with an internal-combustion engine, a storage battery and an engine driven generator; of electrical ignition apparatus for the engine; means for connecting the battery with the generator and with the ignition apparatus including automatic provisions for disconnecting the battery from the generator and ignition apparatus when the engine speed decreases to a certain amount; and hydrometer operated means for disconnecting the ignition apparatus, when the battery is substantially fully charged; said means being operative during the period of inversion of stratification of the battery electrolyte whereupon the engine will be rendered inoperative thereby permitting said automatic provisions to operate, and thereafter said last means is restored to circuit closing position by the cessation of the inversion of stratification.

2. In an electrical system, the combination with an internal-combustion engine and ignition apparatus therefor; of a storage battery; means for charging the battery; means for connecting the battery with the ignition apparatus including automatic provisions for disconnecting the battery from the ignition apparatus when the engine speed decreases to a certain value; said means being operative during the period of inversion of stratification of the battery electrolyte whereupon the engine will be rendered inoperative thereby permitting said automatic provisions to operate, and thereafter said last means is restored to circuit closing position by the cessation of the inversion of stratification.

3. In a battery charging system, the combination with an internal-combustion engine, and a dynamo electric machine operable as a motor to start the engine or as a generator for charging purposes; of a storage battery; ignition apparatus for the engine; means for connecting the battery with the ignition apparatus and with the dynamo to start the engine, said means including automatic provisions for maintaining said connections as long as the engine speed exceeds a certain value, otherwise for breaking said connections; and hydrometer operated means for disconnecting the ignition apparatus when the battery is substantially fully charged, said means being operative during the period of inversion of stratification of the battery electrolyte whereupon the engine will be rendered inoperative thereby permitting said automatic provisions to operate, and thereafter said last means is restored to circuit closing position by the cessation of the inversion of stratification.

4. In an electrical system, in combination, a storage battery; current-generating means adapted to charge the battery; a circuit for connecting the current-generating means with the battery; a control circuit for the current-generating means, said circuit including a switch; and hydrometer means operative during the period of inversion of stratification of the battery electrolyte for operating said switch to render the current-generating means inoperative to further charge the battery, said means including provisions for restoring said switch to its initial position after a brief period of time.

5. In an electrical system, the combination with an internal-combustion engine and ignition apparatus therefor; of a storage battery; means for charging the battery; means for connecting the battery with the ignition apparatus including automatic provisions for disconnecting the battery from the ignition apparatus when the engine speed decreases to a certain value; a switch operatively connected with the ignition circuit; and means for actuating said switch to render the ignition circuit inoperative when the battery is substantially fully charged, said last-mentioned means operating without further charge or discharge of the battery to automatically restore said switch to its initial position after a brief period.

6. In an electrical system, in combination, a storage battery; current-generating means adapted to charge the battery; a circuit for connecting the current-generating means with the battery to charge the latter; a control circuit for the current-generating means, said circuit including a switch; and means for actuating said switch to render the current-generating means inoperative when the battery is substantially fully charged, said actuating means operating without further charge or discharge of the battery to automatically restore said switch to its initial position after a brief period.

In testimony whereof I affix my signature.

FREDERICK J. HARDMAN.

Witnesses:
 MILDRED PEARE,
 ALVINA LEHMAN.